United States Patent
Wang et al.

(10) Patent No.: US 11,748,596 B2
(45) Date of Patent: Sep. 5, 2023

(54) CONTEXT BASED VEHICULAR TRAFFIC PREDICTION

(71) Applicant: International Business Machines Corporation, Armonk, NY (US)

(72) Inventors: Zhi Hu Wang, Beijing (CN); Shiwan Zhao, Beijing (CN); Jing Lan Liu, Beijing (CN); Jun Zhu, Shanghai (CN); Bang An, Beijing (CN); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1047 days.

(21) Appl. No.: 16/421,244

(22) Filed: May 23, 2019

(65) Prior Publication Data
US 2020/0372322 A1    Nov. 26, 2020

(51) Int. Cl.
*G06N 3/042* (2023.01)
*G08G 1/01* (2006.01)
*G06N 3/08* (2023.01)

(52) U.S. Cl.
CPC ............. *G06N 3/042* (2023.01); *G06N 3/08* (2013.01); *G08G 1/0129* (2013.01)

(58) Field of Classification Search
CPC .......... G06N 3/0427; G06N 3/08; G06N 3/04; G08G 1/0129; G08G 1/0112; G08G 1/0116; G08G 1/012
See application file for complete search history.

(56) References Cited

U.S. PATENT DOCUMENTS

| | | | |
|---|---|---|---|
| 7,698,055 B2* | 4/2010 | Horvitz | G08G 1/0104 342/357.31 |
| 9,349,285 B1* | 5/2016 | Fowe | G08G 1/096827 |
| 2007/0208493 A1* | 9/2007 | Downs | G08G 1/0104 701/117 |
| 2008/0097686 A1 | 4/2008 | Takeuchi et al. | |
| 2014/0032091 A1 | 1/2014 | Arcot et al. | |
| 2014/0114556 A1 | 4/2014 | Pan et al. | |
| 2014/0149028 A1 | 5/2014 | Chapman et al. | |
| 2016/0124906 A1* | 5/2016 | Karpov | G06N 3/04 703/2 |
| 2016/0267789 A1* | 9/2016 | Fowe | G08G 1/0116 |
| 2017/0262790 A1* | 9/2017 | Khasis | G08G 1/012 |

OTHER PUBLICATIONS

Zhongjian Lv et al., "LC-RNN: A Deep Learning Model for Traffic Speed Prediction," Proceedings of the Twenty-Seventh International Joint Conference on Artificial Intelligence (IJCAI-18), 7 pages.

(Continued)

*Primary Examiner* — Joseph H Feild
*Assistant Examiner* — Rufus C Point
(74) *Attorney, Agent, or Firm* — Patterson + Sheridan, LLP

(57) ABSTRACT

This disclosure provides embodiments for context based vehicular traffic prediction. A trained neural network modeling a relationship between historical traffic data and associated historical contextual data for a roadway link is obtained. Expected contextual data for a future time period for the roadway link is acquired. Predicted traffic data for the future time period for the roadway link is generated with the trained neural network based on the expected contextual data.

20 Claims, 8 Drawing Sheets

(56) References Cited

OTHER PUBLICATIONS

Wikipedia, "Autoregressive Integrated Moving Average," https://en.wikipedia.org/wiki/Autoregressive_integrated_moving_average May 8, 2019, 8 pages.
Hochreiter et al., "Long Short-Term Memory," Neural Computation 9(8): 1735-1780, 19710, 32 pages.
Chung et al."Empirical Evaluation of Gated Recurrent Neural Networks on Sequence Modeling," arXiv:1412.3555v1 [ cs.NE] Dec. 11, 2014, 10 Pages.

* cited by examiner

CONTEXT BASED VEHICULAR TRAFFIC PREDICTION

BACKGROUND

The present invention relates to the field of intelligent transportation and navigation system, and more particularly to vehicular traffic prediction in a roadway network based on contextual data.

In a navigation system, traffic prediction is quite useful to make an optimum route plan for a motorist. Traffic prediction typically includes estimation of one or more of traffic speed, travel time and traffic volume for one or more road segments in a roadway network. Department responsible for transportation network infrastructure management also needs traffic prediction to carry out traffic monitoring, planning and scheduling. In many vehicle-connected business scenarios, the capability of traffic prediction with high accuracy in a long term is needed. For example, considering a fleet that transports cold fresh food from one market to another across cities, accurate estimation of travel time or time of arrival along different options of routes that accounts for such contextual impacts as from weather, approaching road network and events or activities etc. in the next 1-10 hours (or even next 24 hours) would be favorable. With such estimation, the fleet can choose the optimum route and guarantee a safe and effective transportation.

SUMMARY

Disclosed herein are embodiments of a computer-implemented method, a computer system and a computer program product for context based vehicular traffic prediction.

According to one embodiment of the present invention, there is provided a computer-implemented method. A trained neural network modeling a relationship between historical traffic data and associated historical contextual data for a roadway link is obtained. Expected contextual data for a future time period for the roadway link is acquired. Predicted traffic data for the future time period for the roadway link is generated with the trained neural network based on the expected contextual data.

According to another embodiment of the present invention, there is provided a computer system. The computer system comprises a processor and a computer-readable memory coupled to the processor, the memory comprising instructions that when executed by the processor implement the method as provided according to embodiments of the present disclosure.

According to another embodiment of the present disclosure, there is provided a computer program product. The computer program product comprises a computer readable storage medium having program instructions embodied therewith, the program instructions executable by a processor to cause the processor to implement the method as provided according to embodiments of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
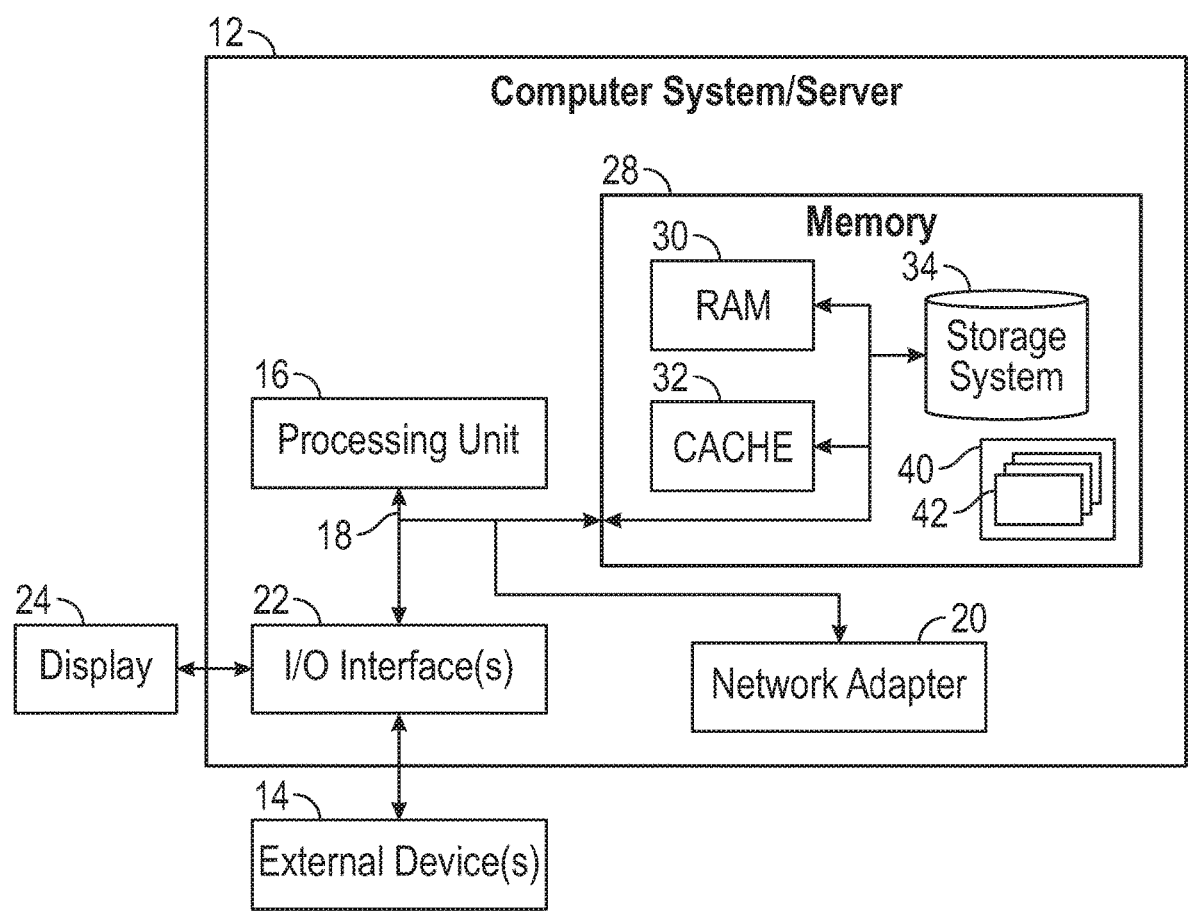
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
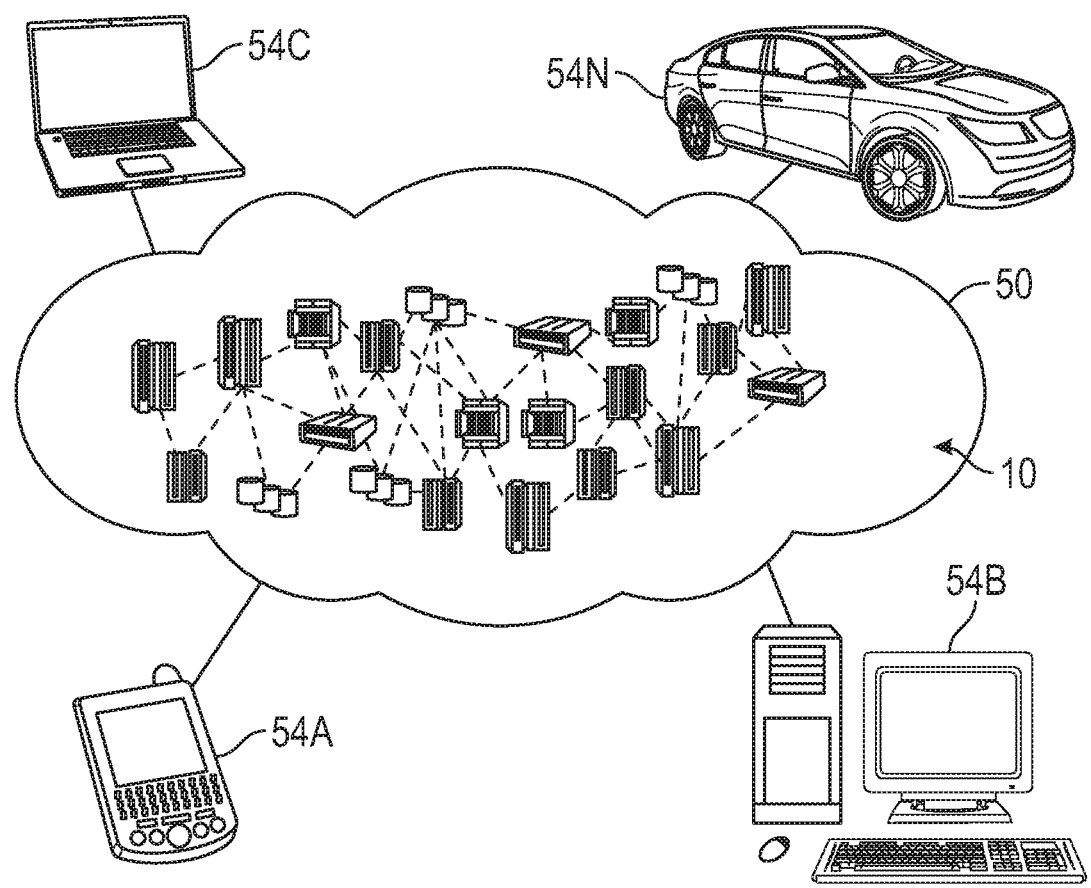
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
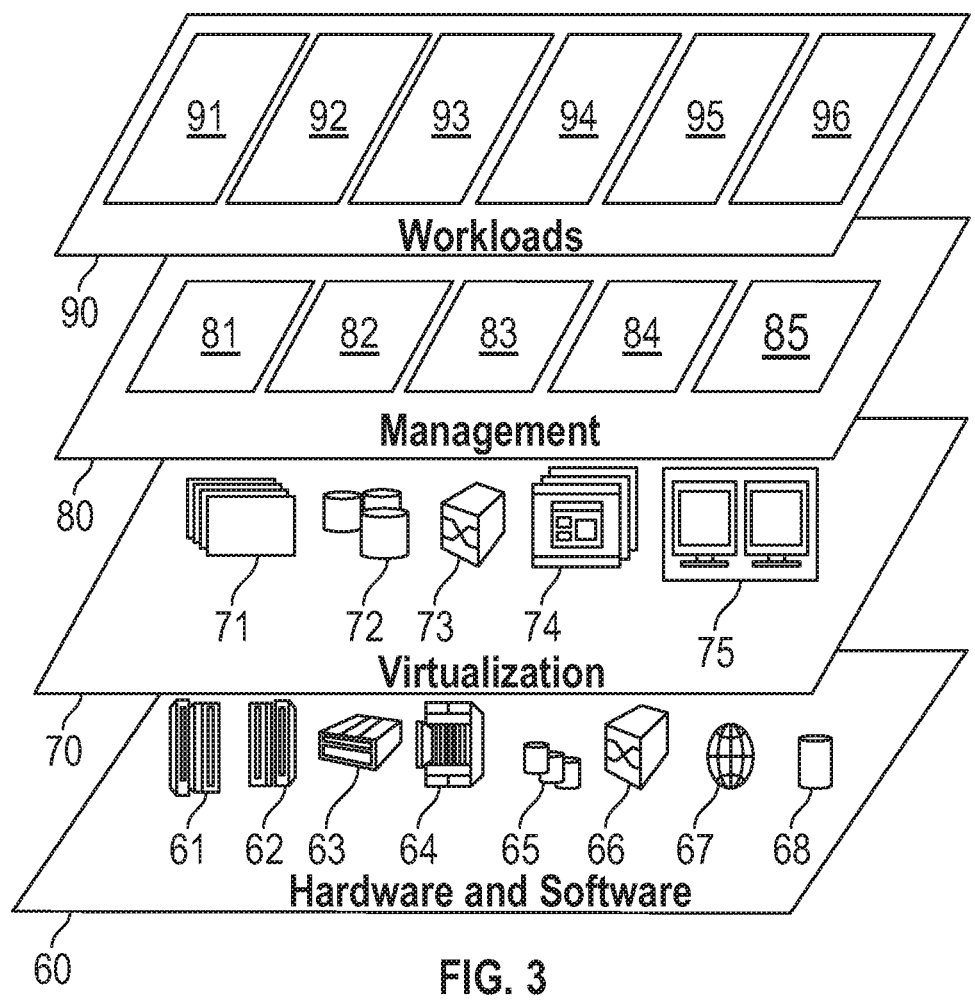
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and traffic modeling and prediction 96. In the following, the principle and structure of traffic modeling and prediction 96 will be described with references to FIG. 4-8.

As discussed above, there is a need for highly accurate vehicular traffic prediction. Existing approaches for traffic prediction include linear regression, neural networks, nearest-neighbor methods, Random Forests, support vector machines, time-series modeling like ARIMA or Kalman filtering and the like. However, few of the existing approaches cover the impacts on the traffic brought by contextual factors and thus have a limited accuracy. Besides, many existing approaches can only make predictions with a relatively high accuracy for the short term future and a deteriorated performance in a long term. Furthermore, when there are billions of road segments in a geographic area covered by a vehicle in a relatively long time period, it is impractical to set up a separate model for each road segment. Thus, there is a need for a model that can be shared by all the roadway links but also preserve the individuality of different links so that a good balance of efficiency and accuracy is made.

The disclosure is directed to a computer system and a computer-implemented method for context based traffic prediction. In an aspect according to the disclosure, by taking contextual information into consideration in the prediction, the predicted traffic data has an improved accuracy. In a further aspect according to the disclosure, regularity analysis of traffic observations may help to keep the prediction stable in a long term.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Embodiments of the present disclosure will be discussed in details in the below with reference to FIG. 4 which depicts a simplified schematic diagram of a traffic prediction system 400 according to an embodiment of the present disclosure. Generally, the system 400 may use a neural network 408 to model a relationship between historical traffic data 402 and associated historical contextual data 404 for a roadway link, the process of which may be referred to as training or deep learning in the related field. A roadway link, or a link hereinafter for short, may refer to a road segment with an arbitrary length of a roadway network of a geographic area. The link may be from one crossroad to another or may be taken as a part from a continuous road without intersections with another road in a long distance. After the training, a trained neural network 408a that models the relationship between the historical traffic data 402 and the associated historical contextual data 404 may be obtained. Then, the system 400 may use the trained neural network 408a to generate predicted traffic data 410 for one or more future time periods based on expected future contextual data 406 for the future time periods, the process of which may be referred to as prediction. The neural network model may be shared between links in a way that the processes of training and/or prediction of the neural network are similar or identical for different links. In some embodiments, the processes of training and/or prediction of the neural network for one link may be performed in parallel to the processes for another link so that the prediction for a roadway network comprising billions of links can be time efficient. In other embodiments, the processes of training and/or prediction of the neural network for different links may be performed successively.

Traffic data for a link may include vehicle's speed when traversing the link, travel time along the link and number of vehicles (traffic volume) in the link for a time instant, among other metrics that may vary over time and can reflect traffic status on the link. Traffic speed and travel time may be an average value among a plurality of vehicles. Traffic data, both historical and predicted, may be time series data that is obtained over one or more time periods. Historical traffic data 402 may be traffic observations collected by traffic sensors disposed along the link in a centralized way or on a plurality of vehicles (e.g. probe vehicles, GPS-enabled devices, traffic cameras) in a distributed way, and transmitted to the system 400 over a wired or wireless communication. Alternatively, historical traffic data 402 may be loaded from one or more database or directly from third parties. In some embodiments, predicted traffic data 410 may be the same metric as historical traffic data 402. In other embodiments, predicted traffic data 410 is a metric different from historical traffic data 402 that can be obtained through a simple calculation based on the same metric as historical traffic data 402. For example, historical traffic data 402 may be vehicular speed, whereas predicted traffic data 410 may be estimated travel time, as future travel time for the link can be calculated from predicted vehicular speed.

Contextual data for a link may include time information, roadway map information, weather information, traffic conditions or events, among other factors that may impact the traffic data acquired in the past and to be predicted in the future. Contextual data may be acquired from different sources such as traffic sensors (e.g., on a roadway), GPS systems, remote map servers, weather radars or a third-party weather information provider, web-crawlers, text-recognition components and traffic reports. Time information may indicate time feature of a time period at which traffic data is acquired or to be predicted, such as day of week, hour of day, weekday or weekend, peak hour or off-peak hour, holiday, and other features that have an impact on traffic data. Roadway map information may describe interconnections with the concerned link such as number of incoming and/or outgoing links, class or type (e.g. highway, urban-road, etc.) of the links, reference real-time and average traffic data of all incoming/outgoing links and link length. Weather information may be historical weather data calculated from measurements of weather radar systems or forecasted weather data determined from weather forecasting models. Weather information may include weather type (e.g. sunny, rainy, cloudy, etc.), temperature, pressure, wind direction and speed, precipitation and snow intensity and the like. Traffic events may include an upcoming or concluded activity, traffic accidents, emergency lane closure or road construction, etc. Contextual data may be static or dynamic (i.e. time related) and may have continuous, discrete or Boolean type values. Static contextual data may be, for example, number of incoming and/or outgoing links, class or type (e.g. highway, urban-road, etc.) of a link, link length and reference traffic data for a link. Static contextual data can be transformed into time series data through interpolation. In this way, contextual data, both historical and expected, can be associated with time features and then be merged with traffic data that shares the same time features. Dynamic contextual data may be, for example, real-time and average traffic data of all incoming/outgoing links, various weather information, time information and traffic events which vary over time. Historical contextual data 404 may be of the same type with expected contextual data 406 with the differences that historical contextual data 404 are observed or measured values while expected contextual data 406 indicates forecasted or predicted conditions. Historical contextual data 404 can be utilized in the training process, while expected contextual data 406 can be utilized in the prediction process.

Neural network, as initially set up, may have a predetermined structure or architecture with free internal states or parameters. Such a neural network needs training before being put into use for prediction. In the exemplary embodiment as shown in FIG. 4, neural network 408 is trained by ingesting historical traffic data 402 and historical contextual data 404 as an input. It is noted that, the procedure of neural network training would be typical and known to a person skilled in the art that and will not be discussed in details for sake of simplification. Generally, input data is grouped into at least a training set and a validation set. Modeling the training set results in a preliminary determination of the internal states or parameters of the neural network. Modeling the validation set then achieves fine tuning of the neural network to find the optimum internal states or parameters. Trained neural network 408a is a version of neural network 408 with the internal states or parameters optimized. By learning historical traffic data, trained neural network 408a is aware of how the traffic data develops over time and how the contextual data is related to the traffic data and is thus able to predict future traffic data by ingesting expected contextual data for the future as an input.

Figure 4:
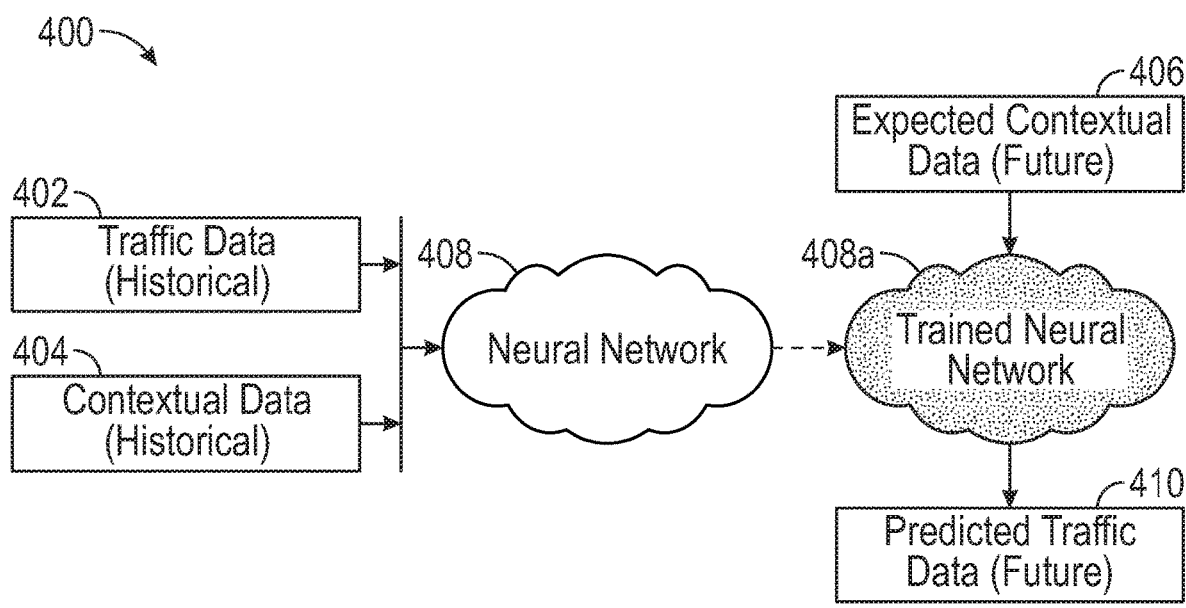
FIG. 4 depicts a simplified schematic diagram of a traffic prediction system according to an embodiment of the present disclosure.

It should be recognized that although in FIG. 4 the system 400 comprises structures for both the training and the prediction, in some other embodiments, the structures for training may be excluded from the system. In other words, the process of training may be performed by other systems. The system 400 directly uses a trained neural network provided by the other systems. For example, a user may use a trained neural network for predicting traffic speed from a third-party provider. The third-party provider may have easy access to historical traffic speed data by deploying and operating a network of road sensors that an ordinary user usually cannot afford. The trained neural network may be updated by the third-party provider at a particular time interval. The trained neural network may be transmitted to the user in the form of its architecture and parameters over a wired or wireless communication.

Figure 5:
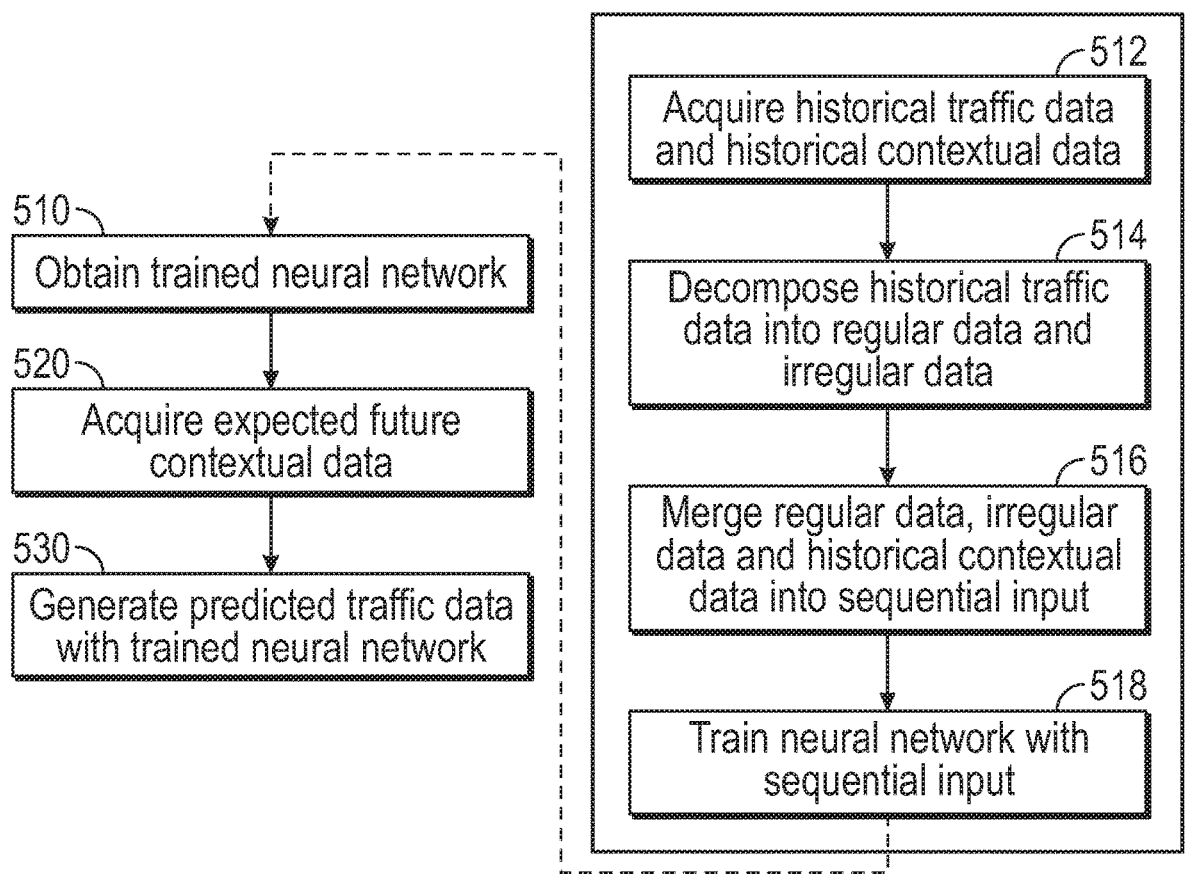
FIG. 5 depicts a flowchart of a traffic prediction method according to an embodiment of the present disclosure.

FIG. 5 depicts a flowchart of a traffic prediction method according to an embodiment of the present disclosure. At step 510, a trained neural network modeling a relationship between historical traffic data and associated historical contextual data for a roadway link may be obtained by a processing unit in accordance with an embodiment of the disclosure. Historical traffic data may be traffic observations for a link for one or more historical time periods. Historical contextual data may be contextual information for a link for one or more historical time periods that may be at least a factor relating to traffic data on the link. Examples of historical traffic data may include traffic speed, travel time and traffic volume. Examples of contextual data may include roadway map information, weather information, time information and traffic events. The associated historical contextual data for a historical time period may be a factor relating to value of the historical traffic data for at least one of the same historical time period and a historical time period subsequent to the same historical time period. As such a neural network can be trained to learn the relationship or the association between the historical traffic data and the historical contextual data and use the learned relationship or association for prediction.

Steps 512-518 illustrate a training process of the neural network with the historical traffic data and associated contextual data. Initially, at step 512, historical traffic data and associated historical contextual data may be acquired for one or more historical time periods. As discussed above, historical traffic data may be collected from various traffic sensors as raw data and then be preprocessed, or may be received from a third party provider in a raw or prepared form. The one or more historical time periods for which historical traffic data and contextual data are acquired may be referred to as training window, as compared to one or more future time periods referred to as prediction window for which a prediction of traffic data is desired. The durations of training window and prediction window are not limited. But generally, the duration of training window is greatly larger than the prediction window for better accuracy.

Next, at step 514, historical traffic data can be decomposed into regular data and irregular data, the process of which may also be referred to as regularity analysis of traffic data. It is recognized that irregular data of the historical traffic data can arise from at least part of the associated historical contextual data. More specifically, at least part of historical contextual data for a historical time period can be a factor relating to value of irregular data of the historical traffic data for at least one of the same historical time period and a historical time period subsequent to the same historical time period. This inner causality may be utilized for estimating future irregular data given expected future contextual data. The decomposition is invertible as can be seen below that predicted traffic data can be composed of expected future regular data and estimated future irregular data. Greater details for the decomposition will be provided below with reference to FIG. 6-7.

Then, at step 516, regular data, irregular data and historical contextual data can be merged into a sequential input, the process of which is referred to as data preparation. Regular data and irregular data are both time series data of which each element indicates a value for a time period. Historical contextual data, as described above, can also be translated into time series data of which each element indicates a value for a time period. Merging the regular data, the irregular data and historical contextual data combines elements of the three items of time series data for the same time period into an array, resulting in an array-based sequential data. For example, $[v_1, v_2, \ldots, v_M]$ and $[C_1, C_2, \ldots, C_M]$ may respectively represent traffic data and associated contextual data acquired for M historical time periods and are both time series data. The traffic data is decomposed at step 514 into regular data $[R_1, R_2, \ldots, R_M]$ and irregular data $[IR_1, IR_2, \ldots, IR_M]$ both of which are also time series data. Merging the regular data, the irregular data and the contextual data results in array-based sequential data $[[R_1, IR_1, C_1], [R_2, IR_2, C_2], \ldots, [R_M, IR_M, C_M]]$, of which each element is an array.

At last, at step 518, the sequential data may be ingested as an input to the neural network to train the neural network. In some embodiments, the neural network may be a neural network for sequential data. Various known architectures may be adopted for neural networks, including feed-forward multi-layer neural networks, Convolutional Neural Networks (CNN) or Recurrent Neural Networks (RNN), of which RNN is more preferred for processing sequential data. Long Short-Term Memory (LSTM) and Gated Recurrent Units (GRU) are two dominant RNNs. Training of the neural network may be carried out on CPU (central process unit) or GPU (graphic process unit) nodes. GPU nodes perfectly satisfy the requirements for neural network training for their high-concurrency and high storage capacities.

As indicated above, the trained neural network may be generated natively, or may be received from a remote computing system over wired or wireless communication. In the former scenario, steps 512-518 may be performed by one or more processing units prior to step 510. In the latter scenario, steps 512-518 may be performed by a remote computing system independently and the resultant trained neural network may be transmitted in the form of its architecture and parameters to decrease the overhead in communication. A processing unit that obtains the trained neural network may re-establish such a neural network based on the architecture and parameters.

Continuing to step 520, expected contextual data for the roadway link for a future time period is acquired by a processing unit. The future time period may be beyond one or more historical time periods for which the historical traffic data and/or the associated contextual data were acquired. In some embodiments, the future time period may be instantly subsequent to the one or more historical time periods. In some other embodiments, the future time period may be several time periods later than the one or more historical time periods. It should be noted that the future time period is defined with respect to the historical time periods and is not intended to exclude a current time period or even a recent time period as long as it is subsequent to the historical time periods. The expected contextual data may be of the same type with the historical contextual data. In some embodiments, the expected contextual data may be acquired simultaneously with historical contextual data as described at step 512. For example, static context information may be interpolated into historical contextual data and expected contextual data in the same way. In other embodiments, expected contextual data may be acquired asynchronously with historical contextual data. The expected contextual data may be prepared and transformed into sequential data before being input into the trained neural network for prediction.

Then, at step 530, predicted traffic data for the roadway link for the future time period is generated with the trained neural network obtained at step 510 based on the expected contextual data acquired at step 520. The trained neural network ingests the expected contextual data for the future time period as an input and generates predicted traffic data for the future time period.

In some embodiments, traffic data for one or more further future time periods may be predicted in a similar process as illustrated by steps 510-530. Second expected contextual data for a second future time period subsequent to the future time period for the roadway link may be acquired. Then second predicted traffic data for the second future time period subsequent to the future time period may be generated using the trained neural network based on the second expected contextual data and the predicted traffic data for the future time period as obtained at step 530. As such each predicted traffic data for a particular future time period is generated based on expected contextual data for the particular future time period and the predicted traffic data for a future time period directly prior to the particular future time period. In this way, traffic data for one or more future time periods may be predicted through an iteration of steps 510-530.

Figure 6:
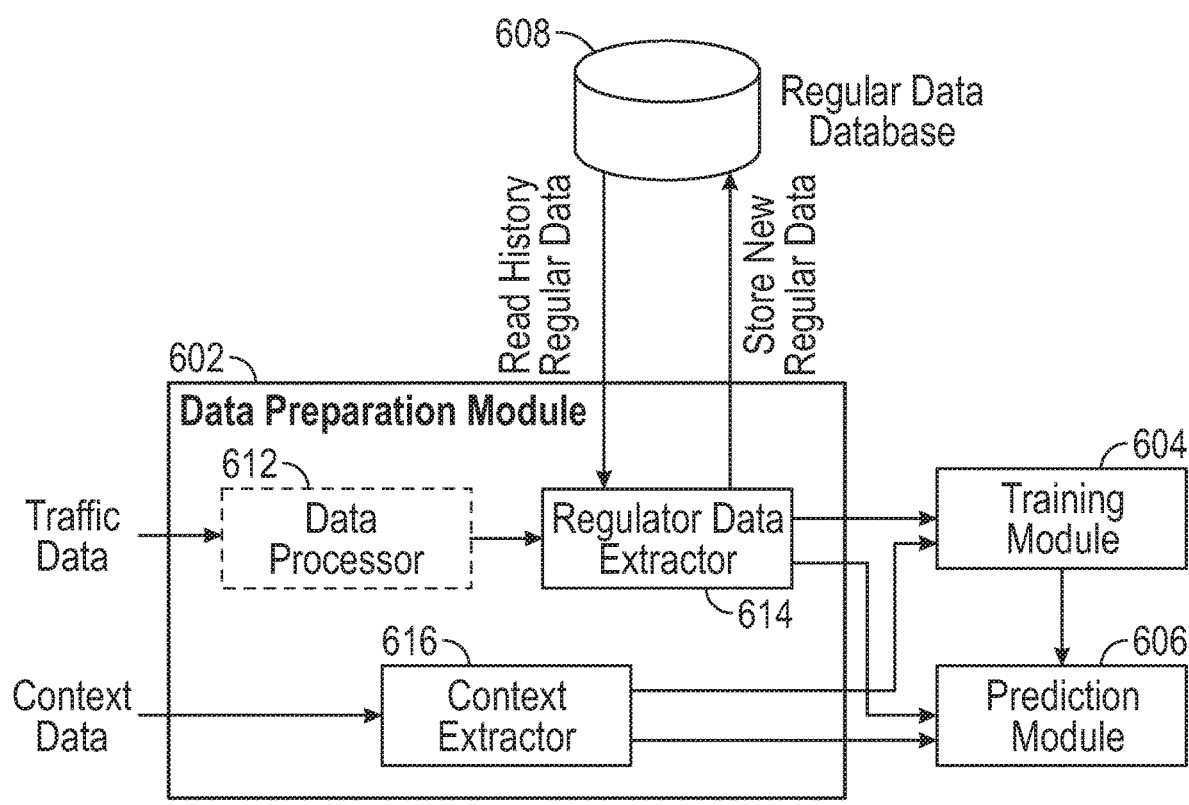
FIG. 6 depicts a block diagram of a traffic prediction system according to an embodiment of the present disclosure.

FIG. 6 depicts a block diagram of a traffic prediction system according to an embodiment of the present disclosure. Data preparation module 602 may transform raw traffic data and/or raw contextual data into sequential training input for training module 604 or into sequential prediction input for prediction module 606. Data preparation module 602 is illustrated to be shared between training module 604 and prediction module 606 as the data preparing processes for training and prediction are quite similar. But it should be recognized that training module 604 and prediction module 606 may have respective data preparation modules. The data preparation module(s), the training module and the prediction module may be located at the same computing system or distributed over different computing nodes.

In data preparation module 602, time series analysis can be applied to raw traffic data by regular data extractor 614. Specifically, regular data extractor 614 may decompose the raw traffic data into seasonal, trend and irregular (or residual) data. Seasonal data can exhibit seasonality in the traffic data and consist of effects that are reasonably stable with respect to timing. Seasonality in the traffic data may be identified by regularly spaced peaks and troughs which have a consistent direction and approximately the same magnitude for each period. Trend data may be defined as "long term" movement in the time series of traffic data without calendar related and irregular effects and reflects the underlying level. For example, historical traffic speed acquired in a long term (e.g. for several years) may exhibit a trend of general decrease in magnitude due to deteriorating traffic conditions. The trend data may change so slowly that over a prediction window the change in the trend data would be negligible with respect to the change in the seasonal data. Seasonal data and trend data may be collectively referred to as regular data or regularity in this disclosure. Regular data is relatively stable in a long term and is predictable. Irregular data is what remains after the seasonal and trend data of the traffic data have been estimated and removed. It results from short term fluctuations in the time series of the traffic data which are neither systematic nor predictable. Irregular data of the traffic data mainly results from factors represented by contextual data. Thus, by learning from historical traffic data and historical contextual data, it is possible to figure out how contextual data is related to the traffic data, especially the irregular data that is difficult to predict. This knowledge facilitates an accurate estimation of future traffic data based on future contextual data.

Figure 7:
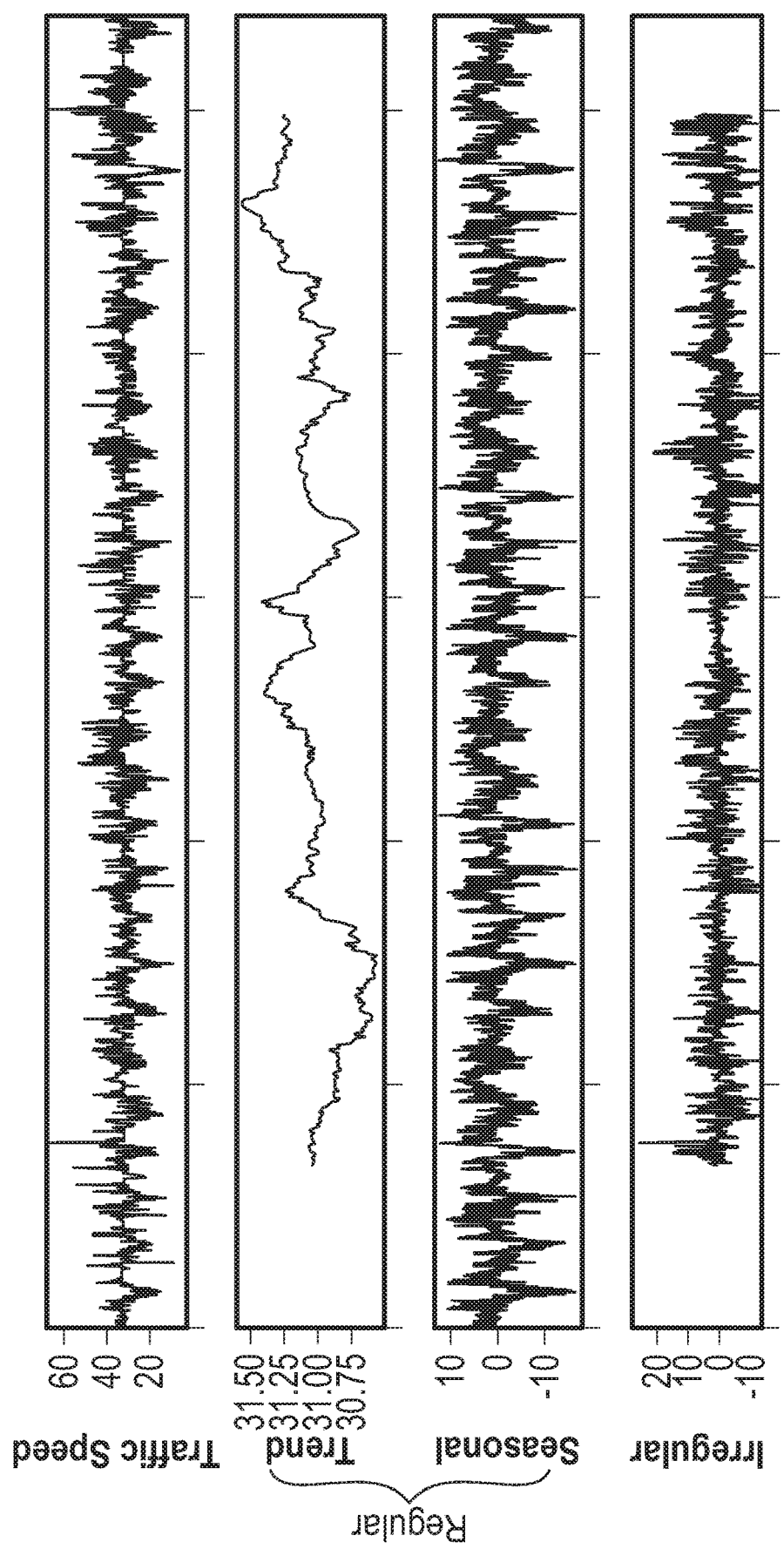
FIG. 7 depicts an example of traffic data decomposition according to an embodiment of the present disclosure.

FIG. 7 depicts an example of traffic data decomposition according to an embodiment of the present disclosure. Traffic speed is collected at predetermined time intervals (e.g. every 15 minutes) over a time period of e.g. one month, which results in time series data. The time series data is then decomposed into trend data, seasonal data and irregular data. Trend data indicates averages of the traffic speed and are relatively stable in term of magnitude in a long time period. Seasonal data shows periodicity of the traffic speed, which is about one week as shown in the plot. Residual data exhibits a large and irregular fluctuation in magnitude and are thus difficult to be predicted. As can be seen from FIG. 7, the fluctuation in the trend data is negligible as compared to the fluctuations in the seasonal data and in the irregular data. As such, traffic speed at a future time interval (e.g. 9:00 a.m. this Wednesday) can be predicted based on trend data and seasonal data at a similar historical time interval (e.g. 9:00 a.m. last Wednesday) and irregular data estimated by the trained neural network. In FIG. 7, the decomposition is described with the traffic speed as the traffic data for the purpose of illustration. However, it should be clear to a person skilled in the art that any other traffic related data as described above may be treated as the traffic data.

Returning to FIG. 6, after decomposition, the relatively stable data, i.e. the regular data of the traffic data as an output of regular data extractor 614 may be stored in a regular data database 608 for later use. Regular data extractor may also read history regular data from regular data database 608 and pass it to training module 604 and/or prediction module 606 whenever necessary.

In some embodiments, one or more preprocessing techniques may be applied by data processor 612 to raw traffic data prior to the data being ingested to the regular data extractor 614. Data processor 612 may iteratively smooth out the raw traffic data so that any missing traffic data points are temporally interpolated, and duplicated traffic data points are removed. It should be noted that preprocessing by data processor 612 is not necessary for some other embodiments.

As described above, raw contextual data may be acquired from various sources. Contextual data extractor 616 may extract useful contextual information in a format (e.g. time series) suitable for training module 604 and prediction module 606. In some embodiments, the contextual data from the contextual data extractor 616 and the regular data and the irregular data from regular data extractor 614 for the same historical time periods may be merged into a sequential input. Then the neural network is trained with the sequential input in the training module 604.

In some embodiments, data preparation module 602 may be triggered to run at regular intervals to keep providing new training set to training module 604 so that training module 604 can update the trained neural network.

In some embodiments, in the process of prediction, expected regular data of traffic data for the roadway link for the future time period is also acquired as another input to the trained neural network. In view of long-term stability and predictability of the nature of regular data, expected regular data of traffic data for the future time period may be determined or estimated from traffic data of similar historical time periods. In particular, expected regular data of traffic data for the future time period may be determined or estimated from regular data decomposed from the traffic data of similar historical time periods. As discussed in above, history regular data may be read from regular data database 608 by regular data extractor 614 and transferred to prediction module 606. Similar historical time periods may be defined with respect to periodicity shown in the historical traffic data. For example, if traffic data for the next Wednesday is to be predicted and it is already observed that regular data of historical traffic data has a periodicity of one week, expected regular data for this Wednesday may be derived from historical regular data for the last Wednesday. Predicted traffic data for the future time period may be generated based on the expected regular data and the expected contextual data for the future time period. Specifically, irregular data of the predicted traffic data for the future time period may be predicted with the trained neural network based on the expected contextual data for the future time period. As an inverse process of the decomposition of historical traffic data, expected regular data and predicted irregular data together may compose the predicted traffic data. It is noted that, it would be clear to a person skilled in the art that various existing data analysis methods may be employed for the decomposition and composition and will not be discussed in details for the purpose of simplification.

Figure 8:
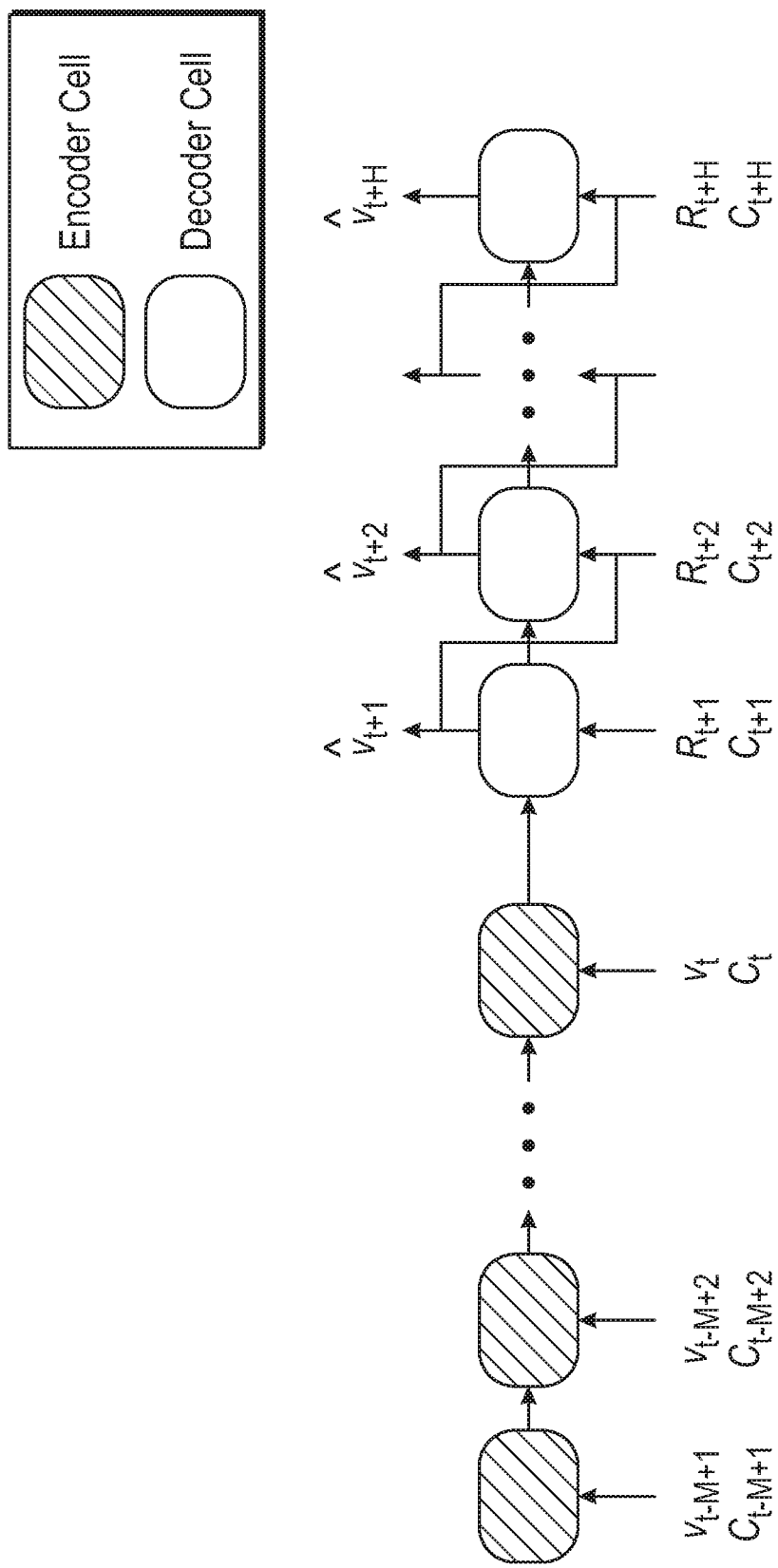
FIG. 8 depicts a structural diagram of a traffic prediction system according to an embodiment of the present disclosure.

In some embodiments, in the process of prediction, traffic data and contextual data for the roadway link for one or more recent time periods are required as another input to the trained neural network. In such a scenario, the prediction of future traffic data is a sequence-to-sequence prediction problem. FIG. 8 depicts a structural diagram for such a traffic prediction system according to an embodiment of the present disclosure. In FIG. 8, traffic speed for the next H time steps is predicted given the previous M traffic observations. $v_{t-m+1}, v_{t-m+2}, \ldots, v_t$ represent traffic speed for the historical M time steps. $C_{t-m+1}, C_{t-m+2}, \ldots, C_t$ represent contextual data for the historical M time steps. $R_{t+1}, R_{t+2}, \ldots, R_{t+H}$ represent expected regular data for the next H time steps, which may be determined or estimated from regular data decomposed from the traffic speed of similar historical time periods. $C_{t+1}, C_{t+2}, \ldots, C_{t+H}$ represent expected contextual data for the next H time steps. The prediction system may generally comprise an encoder consisting of a plurality of encoder cells and a decoder consisting of a plurality of decoder cells. The encoder cells and the decoder cells may be implemented with the neural network trained as described above. The prediction system may ingest traffic speed and contextual data for the recent M time steps and the expected regular data and the expected contextual data for the next H time steps as an input, and generate estimated traffic speed $\hat{v}_{t+1}, \hat{v}_{t+2}, \ldots, \hat{v}_{t+H}$ for the next H time steps. It should be noted that traffic speed and contextual data for the recent M time steps and expected regular data for the next H time steps are not necessary for the prediction.

In an exemplary implementation according to an embodiment of the present disclosure, a traffic speed prediction system is established. The system is trained with historical traffic speed and contextual data from Jun. 15, 2018 to Aug. 16, 2018 for purpose of only an example. Traffic speed and contextual data for one day during a week between Aug. 17, 2018 and Aug. 23, 2018 is used to predict traffic speed for the next four hours. By decomposition of the traffic speed into regular data and taking contextual data into consideration, the resultant predicted traffic speed matches well with true traffic speed collected for the four hours. Both accuracy and long-term stability are improved as compared to traditional method that merely uses average values of traffic speed in training and prediction.

The present invention may be a system, a method, and/or a computer program product at any possible technical detail level of integration. The computer program product may include a computer readable storage medium (or media) having computer readable program instructions thereon for causing a processor to carry out aspects of the present invention.

According to an embodiment of the present disclosure, there is provided a computer system. The computer system comprises a processor and a computer-readable memory coupled to the processor. The memory comprises instructions that when executed by the processor perform action of obtaining a trained neural network modeling a relationship between historical traffic data and associated historical contextual data for a roadway link. The memory further comprises instructions that when executed by the processor further perform action of acquiring expected contextual data for a future time period for the roadway link. The memory further comprises instructions that when executed by the processor further perform action of generating predicted traffic data for the future time period for the roadway link with the trained neural network based on the expected contextual data.

According to an embodiment of the computer system, the associated historical contextual data for a historical time period is a factor related to value of the historical traffic data for at least one of the same historical time period and a historical time period subsequent to the same historical time period.

According to an embodiment of the computer system, the trained neural network is obtained by: acquiring the historical traffic data and the associated historical contextual data for the roadway link; decomposing the acquired historical traffic data into regular data and irregular data; merging the regular data, the irregular data and the associated historical contextual data into a sequential input; and training the neural network with the sequential input so as to result in the trained neural network.

According to an embodiment of the computer system, the neural network is a neural network for sequential data.

According to an embodiment of the computer system, the historical contextual data and the expected contextual data are of the same type and comprise at least one of roadway map information, weather information, time information and traffic events.

According to an embodiment of the computer system, the memory further comprising instructions that when executed by the processor perform actions of acquiring expected regular data of traffic data for the future time period for the roadway link and generating the predicted traffic data for the future time period for the roadway link with the trained neural network based on the expected contextual data and the expected regular data.

According to an embodiment of the computer system, the expected regular data is derived from traffic data of a similar historical time period.

According to an embodiment of the computer system, the memory further comprising instructions that when executed by the processor perform actions of acquiring second expected contextual data for a second future time period subsequent to the future time period for the roadway link and generating second predicted traffic data for the second future time period subsequent to the future time period for the roadway link with the trained neural network based on the second expected contextual data and the predicted traffic data for the future time period.

According to an embodiment of the present disclosure, there is provided a computer program product. The computer program product comprises a computer readable storage medium having program instructions embodied therewith. The program instructions are executable by a processor to cause the processor to obtain a trained neural network modeling a relationship between historical traffic data and associated historical contextual data for a roadway link. The program instructions are executable by a processor to further cause the processor to acquire expected contextual data for a future time period for the roadway link. The program instructions are executable by a processor to further cause the processor to generate predicted traffic data for the future time period for the roadway link with the trained neural network based on the expected contextual data.

According to an embodiment of the computer program product, the associated historical contextual data for a historical time period is a factor related to value of the historical traffic data for at least one of the same historical time period and a historical time period subsequent to the same historical time period.

According to an embodiment of the computer program product, the trained neural network is obtained by: acquiring the historical traffic data and the associated historical contextual data for the roadway link; decomposing the acquired historical traffic data into regular data and irregular data; merging the regular data, the irregular data and the associated historical contextual data into a sequential input; and training the neural network with the sequential input so as to result in the trained neural network.

According to an embodiment of the computer program product, the neural network is a neural network for sequential data.

According to an embodiment of the computer program product, the historical contextual data and the expected contextual data are of the same type and comprise at least one of roadway map information, weather information, time information and traffic events.

According to an embodiment of the computer program product, the program instructions executable by the processor to cause the processor to train the neural network further causes the processor to acquire expected regular data of traffic data for the future time period for the roadway link and to generate the predicted traffic data for the future time period for the roadway link with the trained neural network based on the expected contextual data and the expected regular data.

According to an embodiment of the computer program product, the expected regular data is derived from traffic data of a similar historical time period.

According to an embodiment of the computer program product, the program instructions executable by the processor to further causes the processor to: acquire second expected contextual data for a second future time period subsequent to the future time period for the roadway link and generate second predicted traffic data for the second future time period subsequent to the future time period for the roadway link with the trained neural network based on the second expected contextual data and the predicted traffic data for the future time period.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by a processing unit, a trained neural network modeling a relationship between historical traffic data and the associated historical contextual data for a roadway link;
training the neural network by:
decomposing the historical traffic data into regular data and irregular data, wherein the regular data is the historical traffic data that is decomposed into seasonal data and trend data, and wherein the irregular data is the remainder of the historical traffic data after seasonal and trend data are decomposed;
merging the regular data, the irregular data, and the associated historical contextual data into a sequential input; and
training the neural network with the sequential input so as to result in the trained neural network;
acquiring, by a processing unit, expected contextual data for a future time period for the roadway link; and
generating, by a processing unit, predicted traffic data for the future time period for the roadway link with the trained neural network based on the expected contextual data.

2. The method of claim 1, wherein the associated historical contextual data for a historical time period is a factor relating to value of the historical traffic data for at least one of the same historical time period and a historical time period subsequent to the same historical time period.

3. The method of claim 1, wherein the sequential input is an array of vectors, each vector comprising values processed by time series data preparation.

4. The method of claim 1, wherein the neural network is a neural network for sequential data.

5. The method of claim 1, wherein the historical contextual data and the expected contextual data are of the same type and comprise at least one of roadway map information, weather information, time information and traffic events.

6. The method of claim 1, further comprising:
acquiring, by a processing unit, expected regular data of traffic data for the future time period for the roadway link; and
generating, by a processing unit, the predicted traffic data for the future time period for the roadway link with the trained neural network based on the expected contextual data and the expected regular data.

7. The method of claim 6, wherein the expected regular data is derived from traffic data of a similar historical time period.

8. The method of claim 1, further comprising:
acquiring, by a processing unit, second expected contextual data for a second future time period subsequent to the future time period for the roadway link; and
generating, by a processing unit, second predicted traffic data for the second future time period subsequent to the future time period for the roadway link with the trained neural network based on the second expected contextual data and the predicted traffic data for the future time period.

9. A computer system comprising:
a processor; and
a computer-readable memory coupled to the processor, the memory comprising instructions that when executed by the processor perform actions of:
obtaining a trained neural network modeling a relationship between historical traffic data and the associated historical contextual data for a roadway link;

training the neural network by:
  decomposing the historical traffic data into regular data and irregular data, wherein the regular data is the historical traffic data that is decomposed into seasonal data and trend data, and wherein the irregular data is the remainder of the historical traffic data after seasonal and trend data are decomposed;
  merging the regular data, the irregular data, and the associated historical contextual data into a sequential input; and
  training the neural network with the sequential input so as to result in the trained neural network;
acquiring, by a processing unit, expected contextual data for a future time period for the roadway link; and
generating, by a processing unit, predicted traffic data for the future time period for the roadway link with the trained neural network based on the expected contextual data.

10. The computer system of claim 9, wherein the associated historical contextual data for a historical time period is a factor relating to value of the historical traffic data for at least one of the same historical time period and a historical time period subsequent to the same historical time period.

11. The computer system of claim 9, wherein the sequential input is an array of vectors, each vector comprising values processed by time series data preparation.

12. The computer system of claim 9, wherein the historical contextual data and the expected contextual data are of the same type and comprise at least one of roadway map information, weather information, time information and traffic events.

13. The computer system of claim 9, the memory further comprising instructions that when executed by the processor perform actions of:
  acquiring expected regular data of traffic data for the future time period for the roadway link; and
  generating the predicted traffic data for the future time period for the roadway link with the trained neural network based on the expected contextual data and the expected regular data.

14. The computer system of claim 9, the memory further comprising instructions that when executed by the processor perform actions of:
  acquiring second expected contextual data for a second future time period subsequent to the future time period for the roadway link; and
  generating second predicted traffic data for the second future time period subsequent to the future time period for the roadway link with the trained neural network based on the second expected contextual data and the predicted traffic data for the future time period.

15. A computer program product, comprising a computer readable storage medium having program instructions embodied therewith, the program instructions executable by a processor to cause the processor to:
  obtain a trained neural network modeling a relationship between historical traffic data and the associated historical contextual data for a roadway link;
  train the neural network by:
    decomposing the historical traffic data into regular data and irregular data, wherein the regular data is the historical traffic data that is decomposed into seasonal data and trend data, and wherein the irregular data is the remainder of the historical traffic data after seasonal and trend data are decomposed;
    merging the regular data, the irregular data, and the associated historical contextual data into a sequential input; and
    training the neural network with the sequential input so as to result in the trained neural network;
  acquire expected contextual data for a future time period for the roadway link; and
  generate predicted traffic data for the future time period for the roadway link with the trained neural network based on the expected contextual data.

16. The computer program product of claim 15, wherein the associated historical contextual data for a historical time period is a factor relating to value of the historical traffic data for at least one of the same historical time period and a historical time period subsequent to the same historical time period.

17. The computer program product of claim 15, wherein the sequential input is an array of vectors, each vector comprising values processed by time series data preparation.

18. The computer program product of claim 15, wherein the historical contextual data and the expected contextual data are of the same type and comprise at least one of roadway map information, weather information, time information and traffic events.

19. The computer program product of claim 15, the program instructions executable by the processor to further causes the processor to:
  acquire expected regular data of traffic data for the future time period for the roadway link; and
  generate the predicted traffic data for the future time period for the roadway link with the trained neural network based on the expected contextual data and the expected regular data.

20. The computer program product of claim 15, the program instructions executable by the processor to further causes the processor to:
  acquire second expected contextual data for a second future time period subsequent to the future time period for the roadway link; and
  generate second predicted traffic data for the second future time period subsequent to the future time period for the roadway link with the trained neural network based on the second expected contextual data and the predicted traffic data for the future time period.

* * * * *